Feb. 6, 1962 — A. DU BOIS ETAL — 3,019,745
SUGAR SPINNING MACHINE
Filed Oct. 3, 1960

INVENTORS
Albert DUBOIS
Armand DUBOIS
BY
ATTORNEYS

United States Patent Office
3,019,745
Patented Feb. 6, 1962

3,019,745
SUGAR SPINNING MACHINE
Albert Du Bois, 6105 de Vimy, and Armand Du Bois, 8431 Clark St., both of Montreal, Quebec, Canada
Filed Oct. 3, 1960, Ser. No. 60,020
3 Claims. (Cl. 107—8)

The instant invention relates to a candy-machine, and, more particularly, to a machine adapted to spin sugar into thread-like or silk-like filaments or threads by centrifugal force.

There does not seem to exist, today, machines which make spun sugar. Spun sugar is entirely different from what is known in the trade as candy floss, which looks more like candy cotton, and which is the produce made by the known sugar-spinning machines.

In the latter machines, granulated sugar is introduced into a drum provided with peripheral perforations. The sugar is then heated to a melting temperature, after which the drum is made to spin or rotate rapidly, and the melted sugar thrown outwardly through the perforations by centrifugal action.

It should be observed that the sugar known in the trade as "spun sugar" cannot be made on today's machine. It can be obtained only as follows:

A long handle, having an indented section at one end, like a heavy comb, is first dipped into a hot sugar or syrup solution, heated to a temperature as high as 300 to 320° Fahrenheit. After the comb section is well loaded with sugar, the handle is made to oscillate rapidly in the air, by hand movement at arm's length in such a way as to project the sugar liquid into the air where it freezes in thread-like form.

It will be appreciated, that such a process requires quite a bit of space and is very tiresome. Furthermore, the room into which the process takes place, has to be especially prepared by protecting the walls, ceilings and floors. Also, the operator is very liable to be burnt by flying sugar particles.

The instant invention produces the same end product, while eliminating the aforesaid inconveniences, particularly the manual part of the operation. The old process still works for a limited production, but, becomes quite inadequate above a certain, very limited, quantity of the product.

The invention consists in providing, on a sugar-spinning machine, a hollow rotatable frusto-conical body open at the larger end for the introduction of a sugar syrup, and closed at the other end, and a series of apertures peripherally spread along the lower portion of said body adjacent said closed end.

A better understanding and other advantages of the invention, will become apparent as the following description proceeds, having reference to the annexed drawings wherein.

Figures 1, 2:
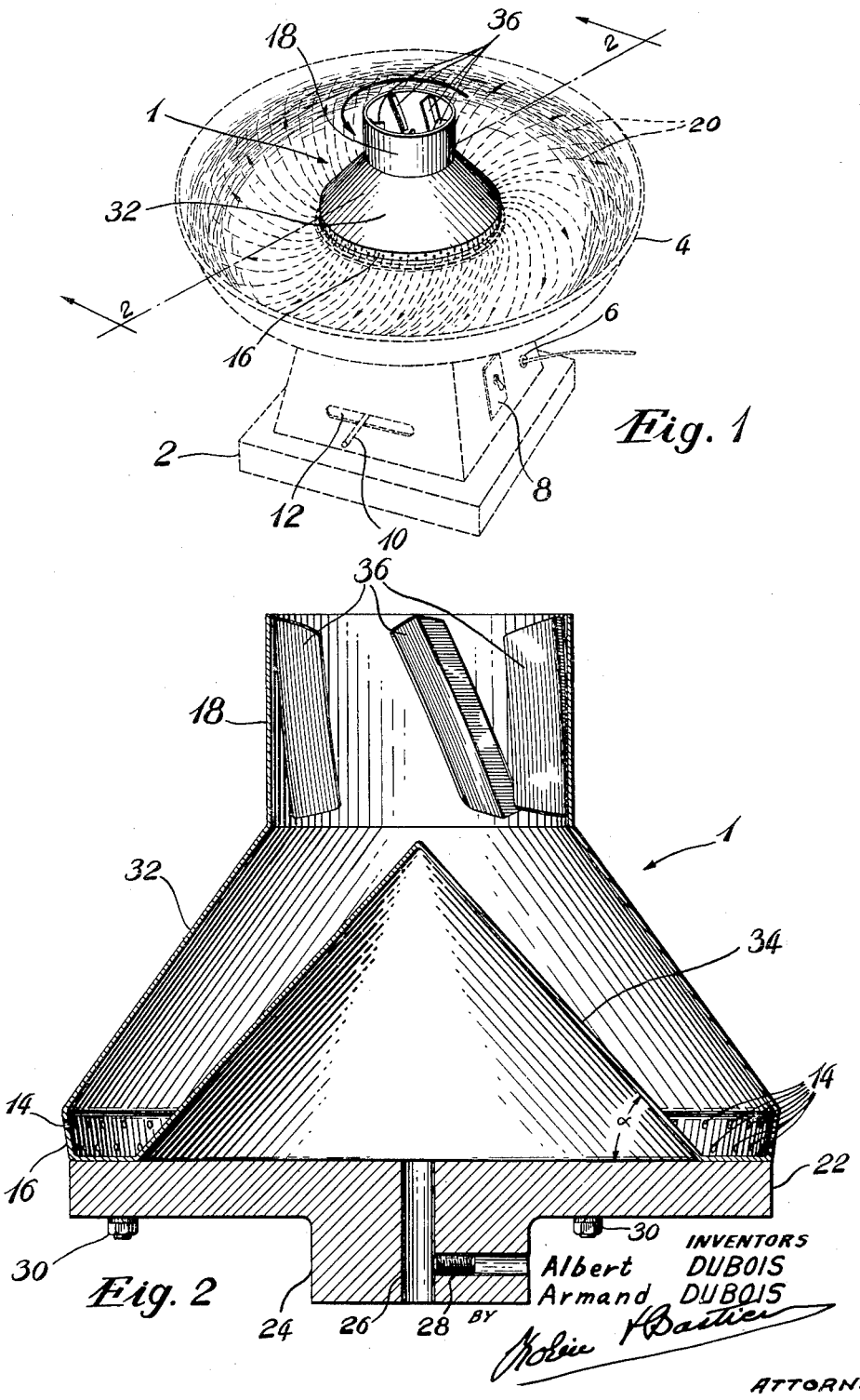
FIG. 1 is a perspective view of a sugar spinning machine, making use of the spinning drum of the invention.
FIG. 2 is a cross-sectional view of the invention along line 2—2 of FIG. 1.

The spinning drum generally identified by numeral 1, is mounted upon a base 2 which is hollow and contains the motor and operating controls. Surrounding the drum and at a slightly lower elevation than the outlet perforations of the drum, a ring-shaped trough 4 is provided, to collect the fabricated spun sugar and also to prevent any splashing of melted sugar droplets should the motor speed be excessive.

The base 2 is, of course, provided with the usual electrical inlet 6, the on-off switch 8 and the speed control lever 10 projecting through an elongated slot 12.

The drum itself is a hollow body provided with a series of holes or perforations 14 peripherally spread over the lower portion 16 thereof. In the case of the invention, sugar, in molten form, is poured in drum 1 through upper inlet opening 18 and drops to the bottom where it is given a rapid swirling motion, by the spinning drum, which throws it outwardly through perforations 14. In the outside, the spun sugar takes on the arcuate shape shown by the arrowed dotted lines 20 of FIG. 1. The curvature of the sugar threads depends, of course, on the speed of the drum 1.

Certain constructional features of the invention have been found quite advantageous and the preferred form is to be found in FIG. 2.

It consists of a drum 1 mounted on a turntable 22 centrally provided with a hub-like projection 24 through which is drilled an aperture 26, which fits the drum over a motor shaft (not shown). This shaft is held against relative rotation with body 1, by any suitable means such as stud 28. The drum is fixed to turntable 24 by such means as nuts and bolts 30.

It has been found preferable to have the drum formed of a frusto-conical portion 32 leading from a cylindrical inlet 18 into the aforesaid cylindrical portion 16. Preferably again, this cylindrical portion 16 should be tapered, slightly inwardly, as shown.

Inwardly spaced from frusto-conical portion 32 of the drum is a conical deflector 34 having a base angle $\alpha$ slightly smaller than the corresponding base angle of frusto-conical portion 32. Finally, the apex of this deflector should be slightly below the lower end of cylindrical inlet opening 18.

To obtain good results, a sugar syrup of high viscosity should be used. It has been found that sugar heated to a temperature slightly lower than the critical caramelizing temperature gives particularly good results.

A series of baffle plates or deflectors 36 are mounted peripherally inwardly or cylindrical opening 18. The purpose of such baffle plates or deflectors is to bring the air in opening 18 in swirling motion and create an air suction therein.

Cone 34 serves to direct the molten sugar rapidly to the base to prevent partial or total solidification thereof before it reaches perforations 14. This will prevent the building up of solidified sugar at the bottom of the container as well as avoid clogging at perforations 14.

As the molten sugar passes centrally through opening 18, it is thoroughly mixed with the swirling air due to the action of the deflectors or plates and is then directed rapidly to perforations 14 where it is forceably expelled by centrifugal action.

It is possible with the apparatus of the invention to obtain a spun sugar, which, contrary to the candy floss now available, will hold its shape for hours, even days, whereas, candy floss will lose its consistency and collapse within a much shorter time. I believe that this is due to the swirling action of the air which results in the production of spun sugar of tubular formation.

We claim:

1. A sugar-spinning machine component comprising: a vertical hollow rotatable frusto-conical body terminated at the smaller diameter and upper end thereof with a cylindrical inlet opening or sugar syrup; a series of inwardly directed upright baffle plates disposed around the inner periphery of said cylindrical inlet; an upright lower portion closed at one end and connected at the other end to the larger diameter end of said frusto-conical body; said lower portion being provided with a plurality of syrup outlet apertures along the periphery thereof; said closed end having a conical deflector extending inwardly therefrom and being spaced from said frusto-conical body.

2. A sugar-spinning machine component comprising: an upright hollow rotatable frusto-conical body joined at the smaller diameter and upper end thereof to a cylindrical inlet opening for sugar syrup; a series of radial vertically inclined baffle plates fixed around the inner periphery of said cylindrical inlet; an upright lower portion closed at one end and connected at the other end to the large diameter end of said frusto-conical body; said lower portion being provided with a plurality of syrup outlet apertures along the periphery thereof; said closed end having a conical deflector extending inwardly therefrom and being spaced from said frusto-conical body; said deflector having an internal angle smaller than the corresponding angle of said frusto-conical body.

3. A sugar-spinning machine component comprising: a vertical hollow rotatable frusto-conical body terminated at the smaller diameter and upper end thereof with a cylindrical inlet opening for sugar syrup and closed at the larger diameter and lower end thereof; a series of inwardly directed baffle plates disposed around the inner periphery of said cylindrical inlet; a plurality of apertures peripherally spread along the lower portion of said body adjacent said closed end and a conical deflector extending inwardly from said closed end and being inwardly spaced from said frusto-conical body.

References Cited in the file of this patent
UNITED STATES PATENTS

| | | |
|---|---|---|
| 792,710 | Kochs | June 20, 1905 |
| 844,939 | Hoffman | Feb. 19, 1907 |
| 847,366 | Pollock | Mar. 19, 1907 |
| 1,530,910 | Parcell | Mar. 24, 1925 |
| 2,032,970 | Bendfelt | Mar. 3, 1936 |
| 2,246,871 | Balch | June 24, 1941 |
| 2,486,194 | Moser | Oct. 25, 1949 |
| 2,651,573 | Leach | Sept. 8, 1953 |
| 2,774,314 | Moser | Dec. 18, 1956 |